(12) United States Patent
Sacre et al.

(10) Patent No.: US 7,505,205 B2
(45) Date of Patent: Mar. 17, 2009

(54) LIGHTING SYSTEM ENABLING COMBINATION OF SEVERAL LIGHT BEAMS

(75) Inventors: Jean-Jacques Sacre, Chateaugiron (FR); Pascal Benoit, Liffré (FR)

(73) Assignee: Thomson Licensing, Boulogne Billancourt (FR)

(*) Notice: Subject to any disclaimer, the term of this patent is extended or adjusted under 35 U.S.C. 154(b) by 409 days.

(21) Appl. No.: 10/562,785

(22) PCT Filed: Jul. 2, 2004

(86) PCT No.: PCT/EP2004/051350
§ 371 (c)(1),
(2), (4) Date: Jun. 19, 2006

(87) PCT Pub. No.: WO2005/012979

PCT Pub. Date: Feb. 10, 2005

(65) Prior Publication Data
US 2007/0058372 A1    Mar. 15, 2007

(30) Foreign Application Priority Data
Jul. 3, 2003 (FR) .................................. 03 08083

(51) Int. Cl.
G02B 6/42 (2006.01)
G02B 27/14 (2006.01)
G02B 27/10 (2006.01)

(52) U.S. Cl. ............... 359/618; 359/640; 359/639; 362/241; 362/245; 362/339

(58) Field of Classification Search ........ 362/236, 362/241, 243, 247, 257; 353/81; 359/636, 359/638, 639, 640
See application file for complete search history.

(56) References Cited

U.S. PATENT DOCUMENTS

| | | | |
|---|---|---|---|
| 3,551,054 A * | 12/1970 | Veret et al. .................. | 356/515 |
| 5,504,544 A | 4/1996 | Dreyer et al. | |
| 6,341,876 B1 | 1/2002 | Moss et al. | |
| 6,498,639 B1 | 12/2002 | Haider | |
| 2001/0048562 A1 | 12/2001 | Bartlett et al. | |
| 2005/0018149 A1* | 1/2005 | Takeda et al. ................. | 353/99 |

FOREIGN PATENT DOCUMENTS

| | | |
|---|---|---|
| DE | 19937417 | 7/2000 |
| FR | 2718535 | 10/1995 |

OTHER PUBLICATIONS

Search Report Dated Nov. 2, 2004.

* cited by examiner

*Primary Examiner*—Ricky L Mack
*Assistant Examiner*—James R Greece
(74) *Attorney, Agent, or Firm*—Robert D. Shedd; Harvey D. Fried; Patricia Verlangieri

(57) ABSTRACT

The invention relates to an illumination system for combining two light beams. A prism bounded by two entrance faces that form a dihedron. An integrator is coupled to an exit face (20.3) of the prism. Each beam penetrates the prism via one of the entrance faces and is reflected by internal reflection on the other entrance face toward the exit face. These beams are substantially focused onto the entrance face of the integrator in such a way that the latter delivers an almost uniform exit beam. Applications: Projection and backprojection apparatus.

10 Claims, 3 Drawing Sheets

LIGHTING SYSTEM ENABLING COMBINATION OF SEVERAL LIGHT BEAMS

BACKGROUND OF THE INVENTION

1. Field of the Invention

Figure 1:
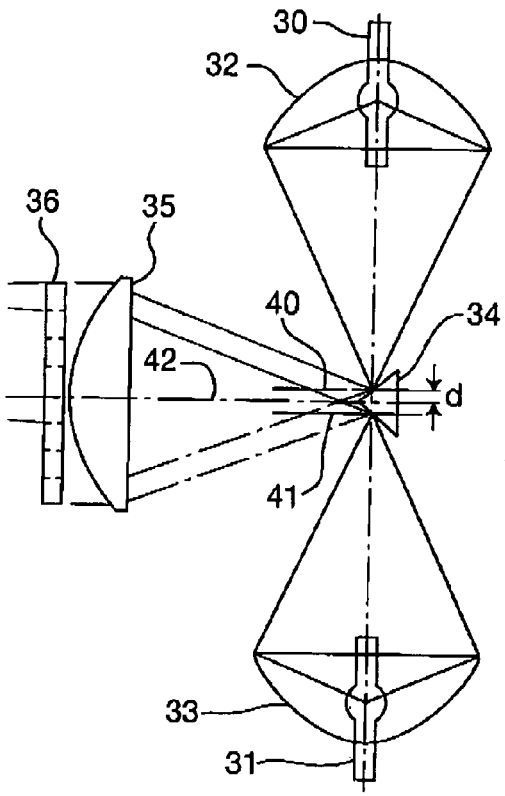

The invention relates to an optical illumination system for illuminating an object and especially to a system for illuminating a spatial light modulator in an image projection or backprojection apparatus. The invention also relates to a projector or a backprojector employing such an illumination system.

2. Related Background of the Invention

In the projection field, it may be necessary to illuminate an individual spatial light modulator using several light sources. This may for example be the case when it is desired to use lamps of limited power levels or when it is desired to use lamps whose light emission spectra are mutually complementary. It is therefore necessary to combine the beams emitted by these sources in order to transmit a single illumination beam onto the modulator.

Various systems such as that disclosed in patent U.S. Pat. No. 6,224,217 (see FIG. 1) are known, in which the beams from two light sources are reflected along the same direction by two reflecting surfaces, such as the external faces of a prism. However, in such a system it is difficult to obtain complete overlap of the two recombined beams so as to obtain a single beam providing uniform illumination.

Other systems, such as that disclosed in patent U.S. Pat. No. 5,504,544 (see FIG. 2), provide an array of prisms that is illuminated by two collimated light beams. The light from each beam penetrates each prism via one face of the prism and is reflected on another face of the prism by internal reflection on this other face. The combination of the prisms of the array thus combines the two beams along a single direction. This system requires a prismatic array that is an expensive component. In addition, the illumination uniformity of the beam obtained as output from the array of prisms is dependent on the uniformity of the beams delivered by the light sources.

Documents U.S. Pat. No. 6,341,876 and US 2001/048562 disclose an optical component for the combining and integrating of beams, which comprises, from upstream to downstream:

upstream, at least one prism, bounded by a first face, called the entrance face, and a second face, which form a dihedron, the entrance face receiving one of the beams coming from the sources, which beam penetrates the prism and is then at least partly reflected by internal reflection on the second face; and downstream, a light integrator comprising a cylindrical rod of transparent material that receives, at one end, called the entrance end, said beams reflected by at least one-prism, the length of the rod being such that the light of said beams is reflected several times on the inside walls of the rod so as to deliver, at the other end, called the exit end, an almost uniform illumination beam.

The prisms may be items separate from the integrator rod as in document U.S. Pat. No. 6,341,876, or they may form an integral part of the rod of the integrator system as in document US 2001/048562.

One drawback of such an optical component for combining and integrating beams is that it requires a large number of prisms, namely one per beam to be combined. This becomes even more problematic when the number of beams to be combined is greater than two.

The invention provides an illumination system for solving the aforementioned drawbacks.

SUMMARY OF THE INVENTION

The invention therefore relates to an illumination system comprising at least two light sources emitting noncollinear and noncollimated light beams, and a prism bounded by at least first and second entrance faces that form a dihedron and by an exit face. Each beam penetrates the prism via one of said entrance faces and is at least partly reflected by internal reflection on other said entrance face toward the exit face. The system also includes a light integrator optically coupled to said exit face and receiving, via one entrance face, said beams reflected by the prism. The length of the rod is such that the light of said beams is reflected several times on the inside walls of the integrator so that the latter delivers, via an exit face, an almost uniform illumination beam. In such an illumination system, at least one prism and the integrator are separate items.

More precisely, the subject of the invention is an illumination system comprising at least two light sources emitting noncollinear and noncollimated light beams, an optical component for combining and integrating these beams, which component is placed in the path of these beams and comprises, from the upstream end of said paths to the downstream end:

upstream, at least one prism bounded by at least first and second entrance faces that form a dihedron, each of the beams penetrating via one of the entrance faces and then being at least partly reflected by internal reflection on another of the entrance faces; and downstream, a light integrator comprising a cylindrical rod of transparent material that receives, at one end, called the entrance end, the beams reflected by at least one prism, the length of the rod being such that the light of these beams is reflected several times on the inside walls of the rod so as to deliver, at the other end, called the exit end, an almost uniform illumination beam.

In the latter illumination system, at least one prism and the rod of the integrator may form only a single item. Each (or at least one), prism therefore combines all the beams emitted by the sources. This results in a simpler and less expensive construction than that shown in FIG. 7 of document U.S. Pat. No. 6,341,876 or in FIG. 1 of document US 2001/048562, which requires one prism per light source. In the case of three light sources to be combined, for example three different primary color sources that can be used for a projection or backprojection apparatus, thanks to the invention only a single prism may be used, which will therefore be a rectangular-based or square-based prism. This same prism could even be used therefore to combine four sources. Thus, the illumination system preferably comprises at least three light sources and/or the optical component comprises, upstream, only a single prism.

Moreover, thanks to the use of noncollimated beams, there are advantageously many reflections on the inside walls of the downstream integrator rod, which produces a more uniform illumination beam at the other end, even with a limited length. Preferably, the aperture of each beam is greater than or equal to 2.

Preferably, the arrangement of the sources and the geometry and material of at least one prism are adapted so that the average directions of the various beams reflected by at least one prism are approximately parallel to one another and parallel to the axis of the cylinder of the rod of the integrator, at least parallel to the axis of this cylinder at the entrance end of the rod. This is because the geometry, and also the index, of the material of the prism determine the orientation of the beams at the exit of the prism.

Preferably, the first and second entrance faces of at least one prism make an angle of approximately 60 degrees between them. Furthermore, the bisector plane of these two faces is preferably parallel to the axis of the cylinder of the rod of the integrator.

In addition, provision may be made for each beam to converge substantially on the entrance end of the integrator.

Said prism may have a pyramidal shape, the exit face of which is a regular polygon having an even number of sides, the lateral faces of which serve as entrance faces.

In an alternative embodiment of the invention, two prisms of right-angled triangular cross section are provided. A first face determining the right angle of each prism is cemented to the entrance face of the integrator. The second faces determining the right angle of each prism enclose a beam splitter.

The invention is applicable to a projection or backprojection apparatus using the illumination system thus described. A spatial light modulator is therefore illuminated by the light transmitted via the exit face of the integrator.

The spatial light modulator may then comprise a liquid-crystal cell.

BREIF DESCRIPTION OF THE DRAWINGS

Figure 2:
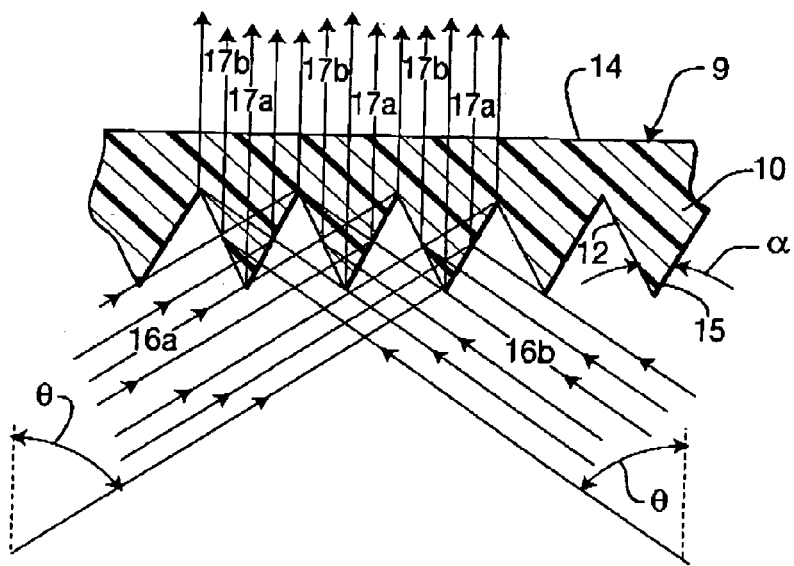
Figure 3A:
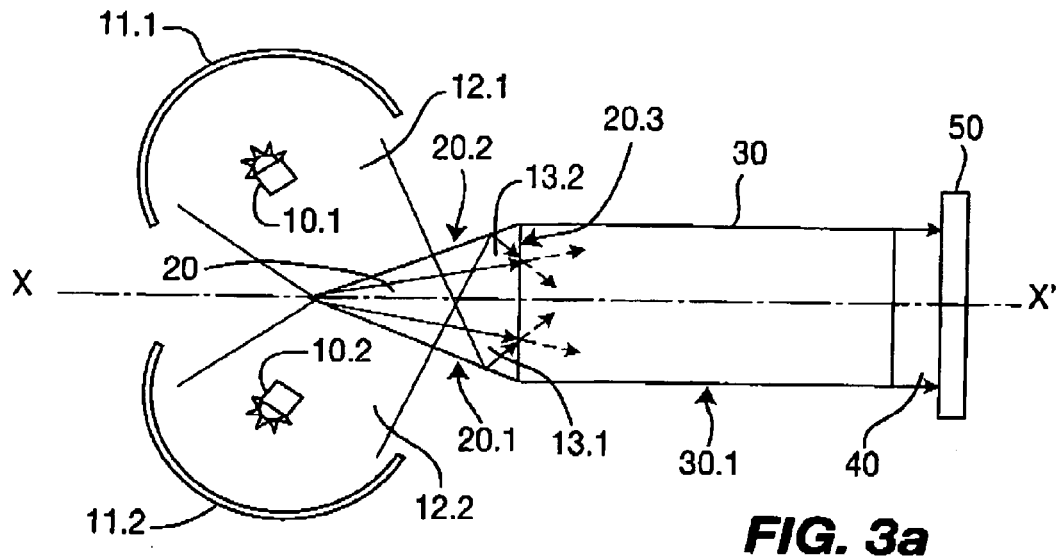
Figure 3B:
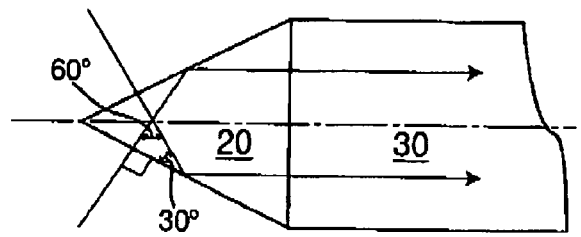
Figure 3C:
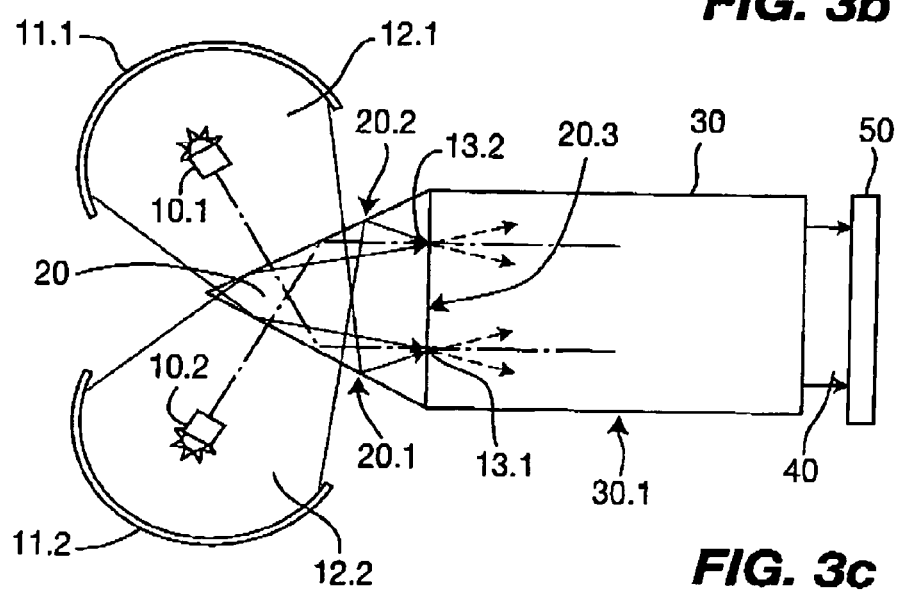
Figure 4:
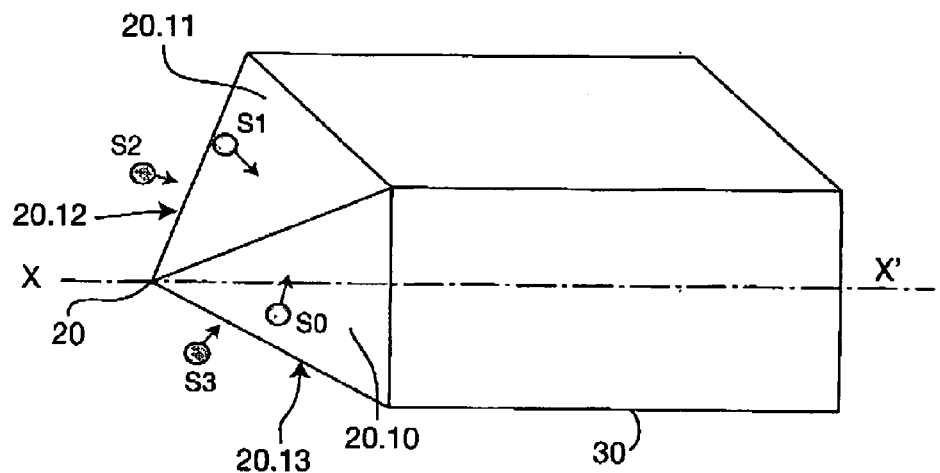
Figure 5:
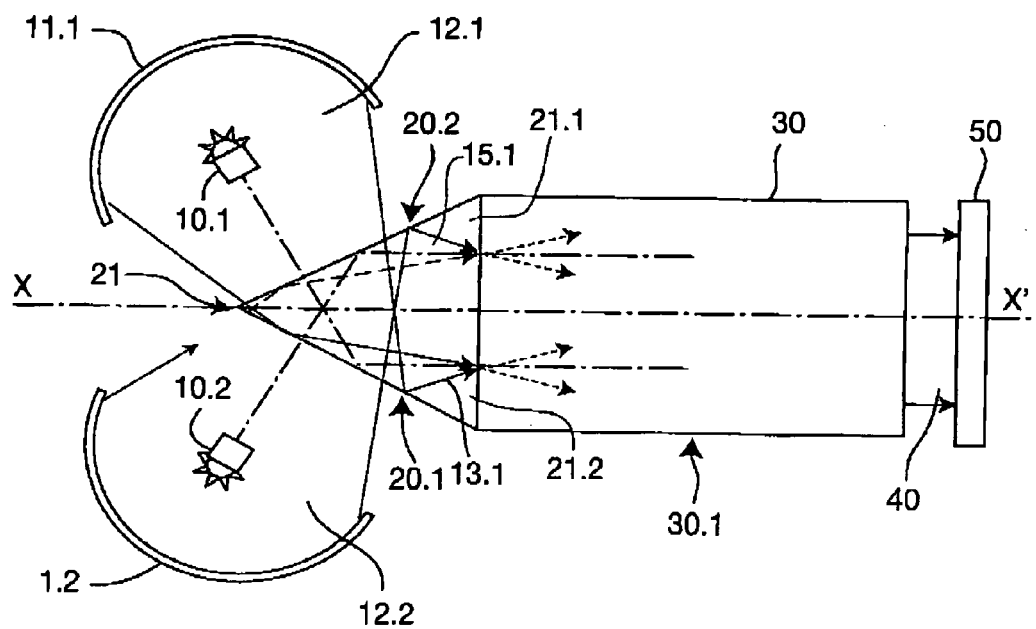

The various aspects and features of the invention will become more clearly apparent in the following description and in the appended figures which show:

FIGS. 1 and 2, known illumination systems of the art and already described above;

FIGS. 3a to 3c, an exemplary embodiment of an illumination system according to the invention;

FIG. 4, an alternative embodiment of the system of the invention, in which the entrance prism has four entrance faces; and FIG. 5, an alternative embodiment of the system of the invention comprising two prisms separated by a beam splitter.

DETAILED DESCRIPTION

An exemplary embodiment of an illumination system according to the invention will therefore be described with reference to FIG. 3a.

This system includes two light sources 10.1-11.1 and 10.2-11.2, each delivering a noncollimated light beam 12.1 and 12.2. Each beam is transmitted to an entrance face of a prism 20 in such a way that it penetrates into the prism and is then reflected on an opposite face of the prism by internal reflection. Thus, the beam 12.1 penetrates the prism 20 via the face 20.2 and is reflected on the opposite face 20.1. Likewise, the beam 12.2 penetrates the prism via the face 20.1 and is reflected on the opposite internal face 20.2.

The reflected beams 13.1 and 13.2 are transmitted, via the face 20.3 of the prism, to an optical integrator 30 in the form of an optical waveguide or rod that possesses an axis of symmetry. The cross section of this integrator may be circular or polygonal.

In the exemplary embodiment shown in FIG. 3a, the axis of symmetry of the rod is aligned with the axis of the prism 20. The beams 13.1 and 13.2 are focused substantially onto the entrance face of the optical integrator 30 or, at least, the envelopes of the beams at the entrance of the integrator are such that the totality of the beams penetrates the integrator. The beams 13.1 and 13.2 therefore penetrate the rod where they undergo multiple reflections on the internal walls 30.1 of the rod. Thereafter, they reemerge via the exit face 30.2 in the form of a single uniform beam 40 for illuminating an object 50, for example a spatial light modulator.

Without departing from the scope of the invention, it is obviously possible to provide, between the exit face 30.2 of the integrator and the object 50, an optic for adapting the size of the beam 40 to the area of the object to be illuminated.

In the exemplary embodiment shown in FIG. 3a, the entrance face of the integrator rod is cemented to the base of the prism, which serves as exit face of the prism.

The angle at the apex of the prism and the angles of incidence of the beams on the faces of the prisms 20.1 and 20.2 are such that the axes of the beams 13.1 and 13.2 reflected by the faces 20.1 and 20.2 make a relatively small, or even zero, angle with the axis of the prism and of the integrator rod. The sources 10.1-11.1 and 10.2-11.2 are placed symmetrically relative to the axis XX' of the prism and illuminate the faces 20.1 and 20.2 at the same angle of incidence.

According to a preferred embodiment of the invention, the beams that penetrate the integrator 30 lie along a direction parallel to the axis of symmetry of the integrator. The basic diagram of FIG. 3b therefore demonstrates that if the beams delivered by the light sources are perpendicular to the entrance faces of the prism, and if it is desired for the beams 13.1 and 13.2 transmitted to the integrator to be certainly parallel, it will be necessary to have a prism whose entrance faces 20.1 and 20.2 make an angle of 60 degrees between them. FIG. 3c therefore shows an illumination system according to the invention in which the beams entering the integrator lie along directions parallel to the axis of the integrator. This embodiment is therefore a preferred embodiment.

Without departing from the scope of the invention, it would be possible to have embodiments in which the directions of the beams 12.1 and 12.2 entering the prisms are not perpendicular to the entrance faces 20.1 and 20.2 of the prisms given that the angle of incidence of the most inclined rays of these beams is smaller than the limiting angle above which there would be reflection on the entrance faces. It would also be possible to have embodiments in which the angle between the faces 20.1 and 20.2 is different from 60 degrees.

Likewise, FIG. 3c shows the beams focused onto the entrance face of the integrator rod, although this is not obligatory. All that is required is for the envelope of each beam, after passing through the prism, to be contained within the integrator rod.

The prism 20 in FIGS. 3a to 3c has two entrance faces 20.1 and 20.2, allowing two beams to be combined into a single illumination beam. In an alternative embodiment of the invention shown in FIG. 4, the prism 20 may be a prism in the form of a pyramid whose base is a regular polygon having an even number of sides. Such an entrance prism will allow more than two incoming beams to be combined. According to the example shown in FIG. 4, the base may be a square. In this case, the prism has four entrance faces 20.10 to 20.13. This configuration makes it possible to inject the light from four light sources S0 to S3 into the prism, and therefore into the integrator. The light from the source S0 penetrates the prism via the face 20.10 and is reflected on the face 20.12 (not visible in the figure) which is symmetrical with the face 20.1 relative to the XX' axis. The light from the source S1 penetrates the prism via the face 20.11 and is reflected on the face 20.13, etc.

FIG. 5 shows an alternative embodiment of the invention in which the prism 20 is separated into two rectangular prisms 21.1 and 21.2 by a beam-splitting plate (or layer) 22 positioned along the XX' axis of the integrator 30. The two prisms 21.1 and 21.2 are cemented to the entrance face of the integrator via one of their faces forming the right angle of the prisms, whereas they are cemented via the other faces forming this right angle to the splitter 22 located between these two faces. The hypotenuse faces of the prisms form the entrance faces 20.1 and 20.2 of the prisms.

The light beam 12.1 emitted by the light source 10.1-11.1 penetrates the prism 21.1 via the face 20.2. A first portion of this beam is transmitted by the splitter to the face 20.1 of the prism 21.2 which reflects the received light in the form of the beam 13.1 that penetrates the integrator 30, as described above. A second portion of the beam 12.1 is reflected by the splitter 22 onto the face 20.2 of the prism 21.1, which reflects the received light in the form of a beam 15.1 that then penetrates the integrator 30. The latter thus receives the light emitted by the source 10.1-11.1 in the form of two beams 13.1 and 15.1. This produces better uniformity of the beam 40 output by the integrator.

In FIG. 5, only the path of the light beam 12.1 emitted by the light source 10.1-11.1 has been shown. The path of the beam emitted by the light source 10.2-11.2 is symmetrical with that described above. However, it may be pointed out that the beam 12.2 emitted by the source 10.2-11.2 will be split into two portions by the splitter 22. If the two light sources are arranged symmetrically relative to the plane containing the splitter 22 and if the two prisms are parallel to this plane, that portion of the beam transmitted by the splitter will be superimposed on that portion (shown by the dotted lines in FIG. 4) of the beam 12.1 which is reflected by the splitter and will be combined with the beam 15.1. The portion of the beam 12.2 which is reflected by the splitter will be superimposed on that portion of the beam 12.1 which is transmitted by the splitter and will be combined with the latter portion into the beam 13.1.

The light from the two light sources is therefore distributed by the prisms 21.1 and 21.2 over the upper and lower portions of the entrance face of the integrator 30.

This arrangement thus improves the uniformity of the exit beam 40. This is all the more beneficial when the lamps of the light sources may have different spectral characteristics. Furthermore, should one of the lamps no longer deliver a light beam, the system will be able to maintain its illumination uniformity.

The invention also applies to cases in which the prism or prisms form a single item with the rod of the integrator system. The invention applies most particularly to cases in which the illumination systems comprise more than two light sources, and advantageously it reduces the number of prisms needed to combine the beams.

The invention is therefore applicable to a projector (or a backprojector) as shown schematically in FIG. 5. The object 50 is in this case a spatial light modulator such as a liquid-crystal cell. The system must then be supplemented in a manner known per se by a projection optic for projecting, onto a screen, the image resulting from the modulation of the light transmitted by the integrator to the spatial light modulator 50.

The invention claimed is:

1. An illumination system comprising at least two light sources emitting noncollinear and noncollimated light beams, an optical component for combining and integrating said beams, which is placed in the path of said beams, comprising, from the upstream end of said paths to the downstream end:
    upstream, at least one prism bounded by at least first and second entrance faces that form a dihedron, at least one of the entrance faces receiving one of said beams, which penetrates the prism and is then at least partly reflected by internal reflection on another of said entrance faces; and
    downstream, a light integrator comprising a cylindrical rod made of transparent material, which receives at one end, called the entrance end, said beams reflected by at least one prism, the length of the rod being such that the light of said beams is reflected several times on the inside walls (30.1) of said rod so as to deliver at the other end, called the exit end, an almost uniform illumination beam, wherein each beam from all of the sources penetrates each prism.

2. The illumination system as claimed in claim 1, wherein the arrangement of said sources and the geometry and material of at least one prism are adapted so that the average directions of the various beams reflected by at least one prism are approximately parallel to one another and parallel to the axis of the cylinder of the rod of the integrator.

3. The illumination system as claimed in claim 1, wherein it includes at least three light sources.

4. The Illumination system as claimed in claim 1, wherein said optical component comprises, upstream, only a single prism.

5. The illumination system as claimed in claim 1, wherein the first and second entrance faces of at least one prism make an angle of approximately 60 degrees between them and in that the bisector plane of these two faces is parallel to the axis of the cylinder of the rod of the integrator.

6. The illumination system as claimed in claim 1, wherein each beam converges substantially on the entrance end of the integrator.

7. An illumination system comprising at least two light sources emitting noncollinear and noncollimated light beams, an optical component placed in the path of said beams comprising, from the upstream end of said paths to the downstream end:
    upstream, at least one prism bounded by at least first and second entrance faces that form a dihedron and by an exit face, each beam penetrating the prism via one of said entrance faces and being at least partly reflected by internal reflection on the other of said entrance faces; and
    downstream, a light integrator comprising a transparent cylindrical rod that receives at one end, called the entrance end, said beams reflected by at least one prism, the length of the rod being such that the light of said beams is reflected several times on the inside walls of said rod so as to deliver at the other end, called the exit end, an almost uniform illumination beam wherein said optical component comprises, upstream, two prisms having right-angled triangular cross sections, a first face determining the right angle of each prism being cemented to the entrance end of the integrator, and the second faces determining the right angle of each prism enclosing a beam splitter.

8. A projection or backprojection apparatus applying the illumination system as claimed in claim 1, wherein it includes a spatial light modulator illuminated by the light transmitted via the exit end of the integrator.

9. A projection or backprojection apparatus applying the illumination system as claimed in claim 7, wherein it includes a spatial light modulator illuminated by the light transmitted via the exit end of the integrator.

10. The projection or backprojection apparatus as claimed in claim 9, wherein the spatial light modulator comprises a liquid-crystal cell.

* * * * *